(12) United States Patent
Zhang et al.

(10) Patent No.: US 11,212,826 B2
(45) Date of Patent: Dec. 28, 2021

(54) WIRELESS COMMUNICATIONS METHOD AND DEVICE FOR TRANSMITTING SCHEDULING REQUEST

(71) Applicants: SHARP KABUSHIKI KAISHA, Sakai (JP); FG INNOVATION COMPANY LIMITED, Tuen Mun (HK)

(72) Inventors: Chongming Zhang, Shanghai (CN); Shohei Yamada, Sakai (JP); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 26 days.

(21) Appl. No.: 16/621,061

(22) PCT Filed: Jun. 22, 2018

(86) PCT No.: PCT/CN2018/092413
§ 371 (c)(1),
(2) Date: Dec. 10, 2019

(87) PCT Pub. No.: WO2018/233682
PCT Pub. Date: Dec. 27, 2018

(65) Prior Publication Data
US 2020/0221483 A1    Jul. 9, 2020

(30) Foreign Application Priority Data
Jun. 23, 2017    (CN) .................. 201710491434.X

(51) Int. Cl.
*H04W 72/12* (2009.01)
*H04W 76/27* (2018.01)
(Continued)

(52) U.S. Cl.
CPC ....... *H04W 72/1278* (2013.01); *H04L 5/0055* (2013.01); *H04W 72/1263* (2013.01); *H04W 76/27* (2018.02); *H04W 80/02* (2013.01)

(58) Field of Classification Search
CPC ............. H04W 72/1278; H04W 76/27; H04W 72/1263; H04W 80/02; H04L 5/0055
See application file for complete search history.

(56) References Cited

U.S. PATENT DOCUMENTS

2010/0195629 A1    8/2010  Chen et al.
2011/0243066 A1*  10/2011  Nayeb Nazar ........ H04L 1/1671
                                                           370/328
(Continued)

FOREIGN PATENT DOCUMENTS

CN    101795497 A    8/2010
WO    2016010227 A1  1/2016

OTHER PUBLICATIONS

3GPP TSG RAN WG1 Meeting #89 R1-1707572; May 2017 (Year: 2017).*
LG Electronics, "Scheduling request by dedicated physical channel in NB-IoT", 3GPP TSG RAN WG1 Meeting #89; R1-1707572; Hangzhou, P.R. China, May 15-19, 2017.
(Continued)

*Primary Examiner* — Ricky Q Ngo
*Assistant Examiner* — Stephen N Steiner
(74) *Attorney, Agent, or Firm* — ScienBiziP, P.C.

(57) ABSTRACT

The present disclosure provides a method performed by user equipment. The method comprises: initiating a first timer based on a state related to a scheduling request; and when the first timer expires, then transmitting information related to the scheduling request. Furthermore, the present disclosure further provides corresponding user equipment.

2 Claims, 2 Drawing Sheets

(51) Int. Cl.
*H04L 5/00*    (2006.01)
*H04W 80/02*   (2009.01)

(56) References Cited

U.S. PATENT DOCUMENTS

2012/0294273 A1    11/2012  Joonkui et al.
2018/0242357 A1*    8/2018  Khirallah .............. H04W 72/14
2019/0281619 A1*    9/2019  Lee .................. H04W 72/1273

OTHER PUBLICATIONS

Huawei, HiSilicon, Neul, "New WID on Further NB-IoT enhancements", #3GPP TSG RAN Meeting #75; RP-170852; Dubrovnik, Croatia, Mar. 6-9, 2017.
Qualcomm Incorporated,"New Work Item: NarrowBand IoT (NB-IOT)", 3GPP TSG RAN Meeting #69; RP-151621; Phoenix, USA, Sep. 14-16, 2015.
Motorola, "ACK/NACK and SR Multiplexing in PUCCH", 3GPP Draft; R1-080085, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; Jan. 8, 2008, Jan. 8, 2008 (Jan. 8, 2008), XP050108623 [retrieved on Jan. 8, 2008] * paragraph [0003] *.
Texas Instruments, "Simultaneous ACK/NAK and SR Transmission in Uplink", 3GPP Draft; R1-074687-ACKNAKSR, 3rd Generation Partnership Project (3GPP), Mobile Competence Centre ; 650, Route Des Lucioles ; F-06921 Sophia-Antipolis Cedex ; France, vol. RAN WG1, No. Korea; Oct. 30, 2007, Oct. 30, 2007 (Oct. 30, 2007), XP050108162, [retrieved on Oct. 30, 2007] * paragraphs [0001] , [0002] *.

* cited by examiner

WIRELESS COMMUNICATIONS METHOD AND DEVICE FOR TRANSMITTING SCHEDULING REQUEST

TECHNICAL FIELD

The present disclosure relates to the wireless communications technologies field, and specifically to a method and device for transmitting a scheduling request.

BACKGROUND

With the rapid growth of mobile communication and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

In order to better implement the Internet of Everything, a new work item (see non-patent literature: RP-151621 New Work Item: NarrowBand IOT (NB-IoT)), which may be referred to as narrowband Internet of Things (NB-IoT), was proposed in the 3rd Generation Partnership Project (3GPP) Long Term Evolution (LTE) standard at the 3GPP RAN #69 plenary meeting held in September 2015. In the description of the project, in order to meet the requirements for low power consumption, long standby time, lowered costs, and wide coverage of Internet of Things terminals, NB-IoT is configured to operate in narrowband systems of uplink/downlink 180 KHz. Regarding first-stage NB-IoT systems, the basic functional design has been completed, including system information broadcast notification, point-to-point unicast uplink data transmission, downlink data reception, and so on. In the first-stage NB-Iot systems, once a terminal side has uplink data to be transmitted, a random access procedure needs to be initiated to transmit a BSR (Buffer Status Report) to a network side.

In order to further enhance the function, a new work item (see non-patent literature: RP-170852 New WID on Further NB-IoT enhancements) was established at the 3GPP RAN #75 plenary meeting held in March 2017. This project aims to further enhance NB-Iot systems and proposes a function of transmitting a scheduling request by a physical layer.

A solution is proposed in the prior art to transmit a scheduling request to, a network side using an ACK/NACK feedback resource of downlink data. This solution greatly benefits a user with good signal coverage. However, a problem that needs to be solved is how to avoid activation of the function for a user with weak signal coverage. Furthermore, in this solution, the successful transmission of the scheduling request depends on the existence of an available ACK/NACK feedback resource, that is, arrival of downlink data is required first. If a UE has not received downlink data for a long time, correspondingly, the UE will not have any available ACK/NACK feedback resource to carry the generated scheduling request. In this case, a problem that needs to be solved is how to avoid unnecessary waiting of a UE and transmit a scheduling request or a BSR to the network side in time.

SUMMARY

In order to solve at least some of the aforementioned problems, the present disclosure provides a method and device for transmitting a scheduling request. Specifically, according to one aspect of the present disclosure, a method performed by user equipment is provided, comprising: initiating a first timer based on a state related to a scheduling request: and when the first timer expires, then transmitting information related to the scheduling request.

In one embodiment, the state related to the scheduling request may comprise: the scheduling request is triggered; the scheduling request is triggered and no other unprocessed scheduling requests exist; the scheduling request is transmitted; or a second timer prohibiting transmitting the scheduling request expires.

In one embodiment, the first timer may be initiated or reinitiated when the following case exists: a media access control (MAC) layer obtains a resource capable of being used to transmit the scheduling request; or the MAC layer instructs a physical layer to transmit the scheduling request on an uplink resource.

In one embodiment, when the scheduling request is triggered or a pending scheduling request needs to be transmitted, the MAC layer indicates to the physical layer that the scheduling request needs to be transmitted. When an available resource exists, the physical layer indicates to the MAC layer that the available resource exists to transmit the scheduling request.

In one embodiment, the available resource comprises a physical uplink control channel or a physical uplink shared channel for transmitting an ACK/NACK.

In one embodiment, a timer duration set when the first timer is initiated is different from a timer duration set when the first timer is reinitiated.

In one embodiment, the method may further comprise: when all unprocessed scheduling requests are canceled, stopping the first timer.

In one embodiment, the method may further comprise: when the second timer prohibiting transmitting the scheduling request is initiated, if the first timer is running, then stopping the first timer; and when the second timer prohibiting transmitting the scheduling request expires, reinitiating the first timer.

In one embodiment, the transmitting information related to the scheduling request may comprise transmitting the scheduling request through a dedicated resource or by adopting a random access manner.

According to another aspect of the present disclosure, user equipment is provided, comprising a processor and a memory. The memory stores instructions that, when run by the processor, perform the method described above.

BRIEF DESCRIPTION OF DRAWINGS

The above and other features of the present disclosure will become more apparent with the following detailed description in conjunction with the accompanying drawings.

DETAILED DESCRIPTION

The present disclosure is described in detail below with reference to the accompanying drawings and specific embodiments. Note that the present disclosure should not be limited to the specific embodiments described below. In addition, for simplicity, detailed description of the known art not directly related to the present disclosure is omitted to avoid obscuring the understanding of the present disclosure.

In the following description, an LTE mobile communications system and its later evolved versions are used as exemplary application environments; a base station and a terminal device that support NB-IoT are used as examples to set forth a plurality of embodiments of the present disclosure in detail. However, note that the present disclosure is not limited to the following embodiments, but is applicable to more other wireless communications systems such as a future 5G cellular communications system, and is applicable to other base stations and terminal devices such as base stations and terminal devices supporting eMTC, MMTC, and so on.

Prior to the detailed description, several terms mentioned in the present disclosure are illustrated as follows. The abbreviations involved in the present disclosure shall have the meanings set forth below, unless otherwise indicated.

UE User Equipment
MAC Media Access Control
RRC Radio Resource Control
PUCCH Physical Uplink Control Channel
PUSCH Physical Uplink Shared Channel
DCI Downlink Control Information
ACK/NACK Acknowledgment/Negative-Acknowledgment
CE Control Element
MCS Modulation And Coding Scheme
QPSK Quadrature Phase Shift Keying
BPSK Binary Phase Shift Keying
BSR Buffer Status Report
SR Scheduling Request Several embodiments of the present disclosure are described in detail below.

In order to avoid long-time waiting of UE for an ACK/NACK resource from delaying transmission of a scheduling request, the present disclosure proposes to configure a timer on the UE side. The timer may be configured on a physical layer, or may be configured on a MAC layer or at other locations.

Figure 1:
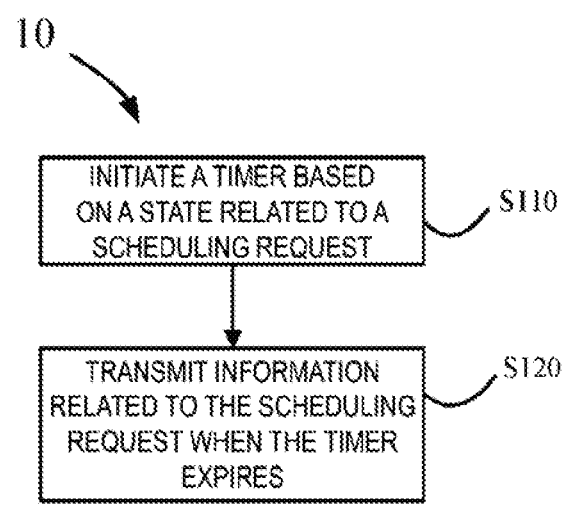
FIG. 1 is a flowchart of a method performed by user equipment according to an embodiment of the present disclosure.

FIG. 1 is a flowchart of a method 10 performed by user equipment (UE) according to an embodiment of the present disclosure.

As shown in FIG. 1, in step S110, a first timer is initiated based on a state related to a scheduling request. For example, the state related to the scheduling request may include: the scheduling request is triggered; the scheduling request is triggered and no other unprocessed or pending scheduling requests exist; the scheduling request is transmitted; or a second timer prohibiting transmitting the scheduling request expires, or the like.

In one embodiment, the first timer may be initiated or reinitiated when the following case exists: a media access control (MAC) layer or a MAC entity obtains a resource capable of being used to transmit the scheduling request; or the MAC layer or the MAC entity instructs a lower layer, for example, a physical layer, to transmit the scheduling request on an uplink resource; or the scheduling request is transmitted. Preferably, the uplink resource may be a PUCCH resource or a PUSCH resource for transmitting an ACK/NACK, or a physical uplink control channel or a physical uplink shared channel for transmitting an ACK/NACK in an NB-Iot system. Furthermore, the uplink resource may further be other resources capable of being used to transmit the scheduling request, for example, a dedicated resource.

In one embodiment, when the scheduling request is triggered or a pending scheduling request needs to be transmitted, the MAC layer or the MAC entity indicates to the lower layer, for example, the physical layer, that the scheduling request needs to be transmitted. Optionally, it may further be indicated that the scheduling request needs to be transmitted through a resource related to an ACK/NACK. The first timer may be initiated when or after the physical layer receives the indication. When an available or valid resource exists, the physical layer may indicate to an upper layer, for example, the MAC layer or the MAC entity, that the available or valid resource exists. Optionally, it may further be indicated that the scheduling request can be transmitted. At the same time, when the available or valid resource exists, the first timer may be stopped. Optionally, when the physical layer indicates to the upper layer, for example, the MAC layer or the MAC entity, that the available or valid resource exists or that the scheduling request can be transmitted, the first timer may be stopped. The available or valid resource may be a physical uplink control channel or a physical uplink shared channel for transmitting an ACK/NACK. The available resource may further be a physical uplink control channel or a physical uplink shared channel for transmitting an ACK/NACK in an NB-Iot system. Furthermore, the available resource may further be other resources capable of being used to transmit the scheduling request, for example, a dedicated resource.

When the MAC layer or the MAC entity receives the indication that the available resource exists, the valid resource exists, or the scheduling request can be transmitted, it can be determined that the MAC layer or the MAC entity obtains an uplink resource capable of being used to transmit the scheduling request. Based on the determination, the MAC layer or the MAC entity can instruct the lower layer (for example, the physical layer) to transmit the scheduling request on the uplink resource.

In one embodiment, the duration of the first timer may be broadcast in system information; the UE obtains the duration by receiving the system information and configures the first timer. Alternatively, the UE may obtain the duration of the first timer through dedicated signaling and configure the first timer.

In one embodiment, a timer duration set when the first timer is initiated is different from a timer duration set when the first timer is reinitiated. For example, when the UE initiates the first timer, the duration of the first timer may be set to X1 (the unit of which may be seconds or TTI lengths). Further, when the UE reinitiates the timer, the duration of the timer may be set to X2 (the unit of which may be seconds or TTI lengths).

Here, X1 may be equal to X2, or X2 may be greater than X1. When X2 is greater than X1, it may be set that X2=X1+T, where T may be a time window length or a timer duration prohibiting the UE from transmitting the scheduling request (that is, after the UE transmits the scheduling request, transmitting the scheduling request again is not allowed in the period of time T).

Furthermore, according to whether the first timer is running, it may be judged whether the UE initiates the timer or reinitiates the timer. Specifically, when the first timer is not yet running and the timer needs to be initiated, the UE initiates the first timer. When the first timer is running and the timer needs to be initiated, the UE reinitiates the first timer.

Furthermore, when the second timer prohibiting transmitting the scheduling request expires, the first timer may be initiated. The second timer prohibiting transmitting the scheduling request refers to a timer initiated after the UE transmits the scheduling request. During running of the second timer. The UE is not allowed to transmit the scheduling request again.

In one embodiment, when the second timer prohibiting transmitting the scheduling request is initiated, if the first timer is running, then the first timer is stopped. When the second timer prohibiting transmitting the scheduling request expires, the first timer is reinitiated.

In one embodiment, when all unprocessed scheduling requests are canceled, if the first timer is running, then the UE may stop the first timer. Or, when a MAC PDU including a BSR is assembled, if the first timer is running, then the UE may stop the first timer. Furthermore, when the second timer prohibiting transmitting the scheduling request is initiated or the scheduling request is transmitted, if the first timer is running, then the UE may stop the first timer. Furthermore, when the second timer prohibiting transmitting the scheduling request expires, the first timer may be reinitiated.

Referring back to FIG. 1, in step S120, when the first timer expires, then information related to the scheduling request is transmitted. Here, the transmitting information related to the scheduling request may include transmitting the scheduling request through a dedicated resource or by adopting a random access manner. Alternatively, after the first timer expires, the UE may trigger a random access procedure.

In one embodiment, after the timer expires, the UE may transmit information related to scheduling, including, but not limited to, a scheduling request or a BSR to a network side in the following manner. The specific, manner includes: triggering a random access procedure through which the UE may transmit the BSR or the scheduling request to the network side; transmitting the BSR or the scheduling request to the network side through a dedicated resource; or transmitting the BSR or the scheduling request to the network side by contention-free access.

If the first timer is configured on the MAC layer or above the MAC layer, then the aforementioned operation may be directly triggered after the first timer expires. If the first timer is configured on the physical layer, then after the first timer expires, the physical layer transmits indication information to the MAC layer, where the information may be waiting for an ACK/NACK resource to fail, or no available valid resource exists, or the scheduling request cannot be transmitted, or the like. The aforementioned operation is triggered after the MAC layer receives the aforementioned information.

The present disclosure further proposes that the UE may receive information from the network side, where the information instructs the UE to activate a function of carrying a scheduling request using an ACK/NACK resource. After the UE receives the indication information of the network side, the function of carrying the scheduling request using the ACK/NACK resource is activated.

For example, the information may be, carried in a MAC CE (for example, a MAC header). The value of an LCID may be used to indicate activation/deactivation of the function. For example, when the value of the LCID is 10111, it is indicated that the function can be activated. When the value of the LCID is 11000, it is indicated that the function is deactivated.

Alternatively, the indication information may further be carried in an RRC message, for example, a message transmitted from the network side to the UE, For example, the information may be indicated using 1 bit in a message carrying a configuration related to a scheduling request, and when the value of the bit is '0', it is indicated that the function is deactivated. When the value of the bit is '1', it is indicated that the function can be activated and vice versa.

Alternatively, the indication information may further be carried in DCI. The information may be explicitly or implicitly indicated in the DCI. For example, to activate or not to activate the function may be indicated through different MCSs indicating an ACK/NACK in the DCI, When the MCS is BPSK, it is indicated the function is deactivated; when the MCS is QPSK, it is indicated the function is activated. Alternatively, the DCI may include a field value, for example, represented by 1 bit. When the value of the bit is '0', it is indicated the function is deactivated. When the value of the bit is '1', it is indicated the function is activated and vice versa. Specifically, the indication information in the DCI may only indicate whether the function can be activated on an ACK/NACK resource scheduled by the DCI.

Alternatively, the network side may further judge, according to information such as uplink or downlink signal strength or a coverage level of the UE, whether the UE can continue to use the function. For example, when the network side judges that the UE cannot use the function, the network side transmits indication information to the UE to deactivate the function. The approach used is similar to that described above.

Alternatively, the UE may, according to the information such as the signal strength or coverage level, judge whether the function needs to be activated or judge whether the function needs to be requested from the network side. The judgment procedure may be as follows: if the current signal strength of the UE is greater than a threshold, then the UE judges that the function can be activated. Alternatively, the UE may transmit information to the network side to request the function to be activated. The judgment procedure may further be as follows: the UE is currently at a coverage level X; then, the UE at the level always activates the function or may request the network side to activate the function. When the current coverage of the UE cannot meet requirements of the level X, for example, changes to a coverage level Y (as compared with X, the coverage level Y here represents weak coverage strength), then the UE does not activate the function or does not request the function to be activated. The threshold or coverage level for judgment is notified by the network side to the UE through broadcasting or, dedicated signaling or adopting a predefined manner.

In addition, the UE may transmit, through RRC signaling, information requesting the function to be activated, or cause the information to be carried in a MAC control element.

Furthermore, the UE may initiate the aforementioned first timer only when receiving indication information (indicating activation of the function of carrying the scheduling request using the ACK/NACK resource), Alternatively, the UE can initiate the first timer only when the function of carrying the scheduling request using the ACK/NACK resource is activated.

Figure 2:
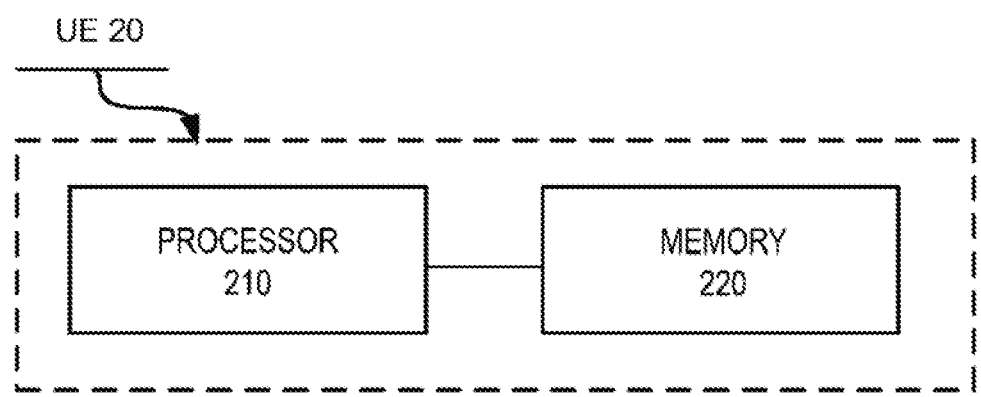
FIG. 2 is a block diagram of user equipment according to an embodiment of the present disclosure.

FIG. 2 is a block diagram of user equipment 20 according to an embodiment of the present disclosure. As shown in FIG. 2, the user equipment 20 includes a processor 210 and a memory 220. The processor 210 may, for example, include a microprocessor, a microcontroller, an embedded processor, or the like. The memory 220 may, for example, include a volatile memory (for example, a random access memory (RAM)), a hard disk drive (HDD), a non-volatile memory (for example, a flash memory), or other memories. The memory 220 stores program instructions. The instructions, when run by the processor 210, can perform the aforementioned method performed by user equipment (for example, the method shown in FIG. 1) described in detail in the present disclosure.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium: an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulting from the appropriate combinations of the technical means disclosed in different embodiments are also included within the technical scope of the present disclosure. In addition, components with the same effect described in the embodiments above may be replaced with one another.

The invention claimed is:

1. A user equipment (UE) for transmitting a Scheduling Request (SR), comprising:
   reception circuitry configured to receive a radio resource control (RRC) message from a network, the RRC message including an information element, the information element indicating to the UE to activate a function of carrying the SR using an acknowledgement or negative acknowledgement (ACK/NACK) resource;
   determining circuitry configured to determine whether a medium access control (MAC) entity has a valid physical uplink shared channel (PUSCH) resource for carrying an ACK/NACK and whether the function is activated;
   instruction circuitry configured to, in response to the determining circuitry determining that the MAC entity has a valid PUSCH resource for carrying the ACK/NACK and the function is activated, instruct a physical layer to signal the SR on the valid PUSCH resource for carrying the ACK/NACK; and
   transmission circuitry configured to transmit the SR on a PUSCH on the valid PUSCH resource for carrying the ACK/NACK.

2. A method for transmitting a Scheduling Request (SR) at a user equipment (UE), the method comprising:
   receiving a radio resource control (RRC) message from a network, the RRC message including an information element, the information element indicating to the UE to activate a function of carrying the SR using an acknowledgement or negative acknowledgement (ACK/NACK) resource;
   determining whether a medium access control (MAC) entity has a valid physical uplink shared channel (PUSCH) resource for carrying an ACK/NACK and whether the function is activated;
   in response to determining that the MAC entity has a valid PUSCH resource for carrying the ACK/NACK and the function is activated, instructing a physical layer to signal the SR on the valid PUSCH resource for carrying the ACK/NACK; and
   transmitting the SR on a PUSCH on the valid PUSCH resource for carrying the ACK/NACK.

* * * * *